United States Patent [19]

Miller et al.

[11] Patent Number: 5,025,159
[45] Date of Patent: Jun. 18, 1991

[54] METHOD FOR DETECTING RADIATION DOSE UTILIZING THERMOLUMINESCENT MATERIAL

[75] Inventors: Steven D. Miller, Richland; Joseph C. McDonald, Pasco; Fred N. Eichner, Kennewick; Paul L. Tomeraasen, Richland, all of Wash.

[73] Assignee: Battelle Memorial Institute, Richland, Wash.

[21] Appl. No.: 420,293

[22] Filed: Oct. 11, 1989

Related U.S. Application Data

[63] Continuation-in-part of Ser. No. 213,245, Jun. 29, 1988, Pat. No. 4,954,707.

[51] Int. Cl.$^5$ .............................................. G01T 1/115
[52] U.S. Cl. .................................. 250/337; 250/484.1
[58] Field of Search .......... 250/337, 484.1 A, 484.1 C

[56] References Cited

U.S. PATENT DOCUMENTS 3,835,329 9/1974 Moran et al. ................. 250/484.1 A
3,962,586 6/1976 Mayhugh et al. ........... 250/484.1 A

*Primary Examiner*—Jack I. Berman
*Assistant Examiner*—Richard Hanig
*Attorney, Agent, or Firm*—Dellett, Smith-Hill and Bedell

[57] ABSTRACT

The amount of ionizing radiation to which a thermoluminescent material has been exposed is determined by first cooling the thermoluminescent material to a cryogenic temperature. The thermoluminescent material is then optically stimulated by exposure to ultraviolet light. Visible light emitted by the thermoluminescent material as it is allowed to warm up to room temperature is detected and counted. The thermoluminescent material may be annealed by exposure to ultraviolet light.

30 Claims, 4 Drawing Sheets

METHOD FOR DETECTING RADIATION DOSE UTILIZING THERMOLUMINESCENT MATERIAL

REFERENCE TO GOVERNMENT CONTRACT

This invention was made with government support under contract number DE-AC06-76RLO 1830, awarded by the U.S. Department of Energy. The government has certain rights in the invention.

CROSS-REFERENCE TO RELATED APPLICATION

This is a continuation-in-part copending patent application Ser. No. 07/213,245 filed June 29, 1988, now U.S. Pat. No. 4,954,707 issued Sept. 4, 1990.

BACKGROUND OF THE INVENTION

The present invention relates to radiation detection technology and more specifically to dosimeters that utilize thermoluminescent materials to measure radiation dosage.

Dosimeters that utilize thermoluminescent materials have been in widescale use for many years. The thermoluminescent materials employed in these devices are crystalline compounds that contain impurities and structural imperfections of various sorts such as missing atoms or ions and regions of misregistry between the planes of their crystal lattices. Some of these imperfections have the ability to capture or "trap" electrons and/or holes in excited states of the type generated by exposure to ionizing radiations such as gamma and beta radiation. The strength with which the electrons and holes are bound by such traps depends upon the nature of the trap and its depth.

Traps are usually characterized by their thermal energy, that is, the temperature to which the thermoluminescent material must be heated in order to ensure release of the charges held by the traps. When these charges are released luminescence commonly occurs. The light quanta emitted may be photometrically detected and related to radiation exposure. Therefore, dosimeters containing thermoluminescent materials are conventionally read out by heating to about 533 K while the intensity of the light emitted by the material is recorded in the form of a "glow curve", the size of which is representative of the amount of ionizing radiation absorbed by the dosimeter.

The above-described procedures (commonly referred to as "TLD" techniques) may be perceived to have a number of important drawbacks. Only traps of intermediate energy between about 470 K and 570 K can be read out, since at temperatures above this range substantial amounts of thermal quenching occur due to non-luminescence producing transitions whereby quantum efficiencies are significantly lowered. Consequently, the information represented by a large number of high energy traps is totally ignored. Further, the incandescent radiation produced by the thermoluminescent material at temperatures above about 570 K raises the level of background noise thereby lowering the signal quality. Additionally, the use of elevated temperatures in the readout process limits the materials that may be used in dosimeter constructions and bars the use of most polymer materials.

It would be desirable to fabricate a dosimeter from particles of thermoluminescent material incorporated in polymer material, both for beta dosimetry and for neutron dosimetry. In the case of a beta dosimeter, the polymer material may be selected to provide nearly tissue equivalent response. In a neutron dosimeter, a hydrogenous polymer material, e.g. polyethylene, would act as a source of hydrogen, allowing measurement of fast-neutrons through proton-recoil effects. However, this has not previously been feasible because most suitable polymer materials melt at temperatures below those required for readout.

In addition to the ability to respond to incident radiation in a manner that can subsequently be read out, it is important for realization of a practical dosimeter based on thermoluminescent material that it be possible to erase or anneal the thermoluminescent material after readout, so as to restore it to its original condition and enable reuse of the dosimeter.

It is known to anneal $CaF_2$:Mn (a common thermoluminescent material) by heat treatment at 673 K for one hour and at 373 K for two hours. Annealing in this fashion is not suitable for a dosimeter that includes polymer material, because the polymer material cannot withstand the heat treatment.

SUMMARY OF THE INVENTION

In accordance with a first aspect of the invention, a method for measuring the dosage of ionizing radiation to which a thermoluminescent material has been exposed comprises the steps of cooling the thermoluminescent material down to a temperature substantially below 200 K, exposing the thermoluminescent material to light radiation in order to photoconvert high temperature traps to low temperature traps, and detecting light released by the thermoluminescent material as it is allowed to warm.

In accordance with a second aspect of the invention, a method for annealing thermoluminescent material that has been exposed to ionizing radiation and from which light representative of the dose of radiation has been released, comprises exposing the thermoluminescent material to ultraviolet light at a temperature substantially above 200 K.

In accordance with a third aspect of the invention, an apparatus for reading out the dosage of radiation to which a solid state thermoluminescent dosimeter has been exposed, comprises means for cooling the dosimeter to a cryogenic temperature, means for exposing the dosimeter to light radiation in order to photoconvert high temperature traps into low temperature traps, and means for detecting and counting the light emitted by the dosimeter as it is allowed to warm.

In accordance with a fourth aspect of the invention, a thermoluminescent material adapted for use in dosimeters that are read out at low temperature after first being cooled and optically stimulated, comprises a polycrystalline compound which is doped with a metallic element in an amount of approximately one to fifteen mole percent.

The subject matter of the present invention is particularly pointed out and distinctly claimed in the concluding portion of this specification. However, both the organization and method of operation, together with further advantages and objects thereof, may best be understood by reference to the following description taken in connection with the accompanying drawings wherein like reference characters refer to like elements.

DESCRIPTION OF THE PREFERRED EMBODIMENT

Figure 1:
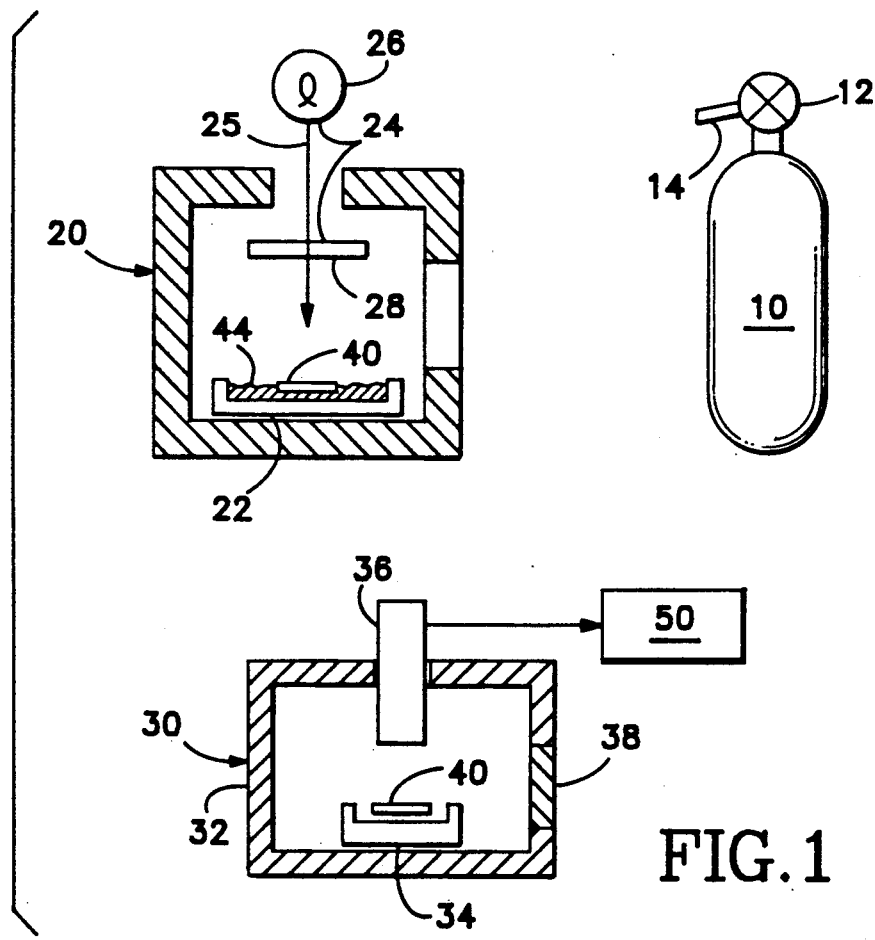
FIG. 1 is a diagrammatic representation of mechanical, electrical and optical components useful in practicing the method of the present invention.
Figure 2:
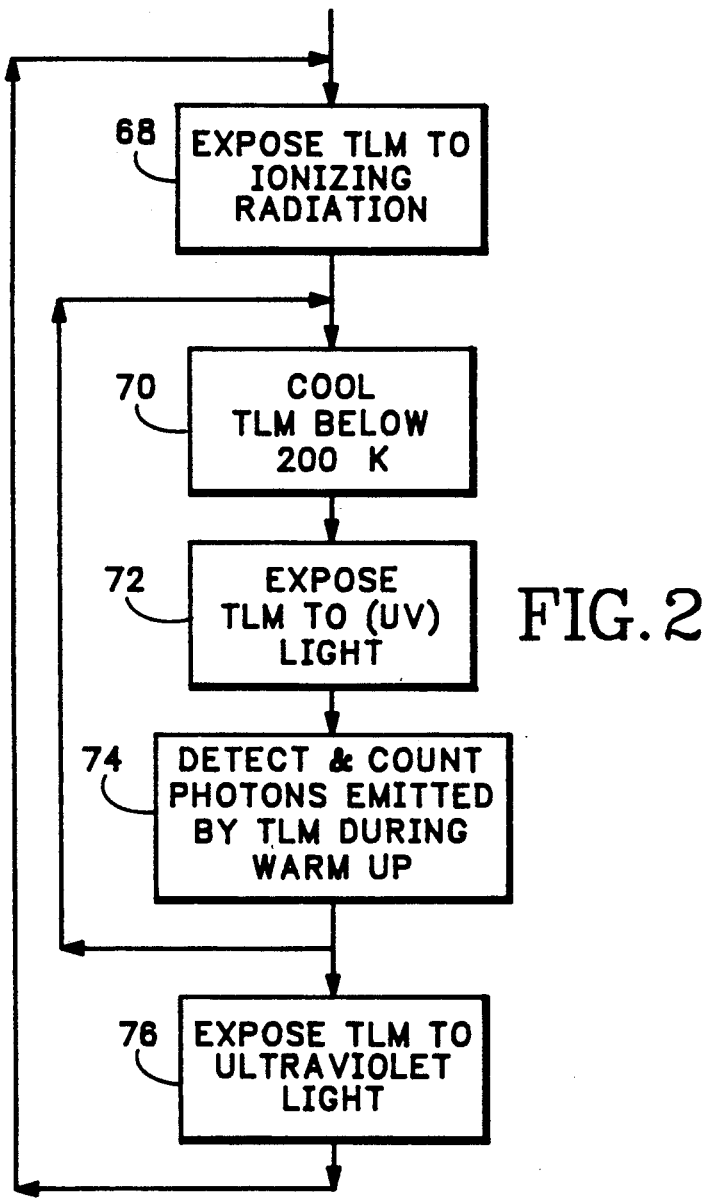
FIG. 2 is a flow diagram of the process steps employed in the method of the present invention.

FIG. 1 illustrates equipment that may be used for measuring dosages of ionizing radiation and FIG. 2 illustrates the process steps by which the dosages may be measured. Referring now to FIG. 1, the dewar flask 10 functions as a source of liquid nitrogen (77 K) which may be dispensed through the valve 12 and spout 14 as required for cooling to cryogenic temperatures. The sample exposure chamber 20 has walls of a thermally insulating material, such as foamed polystyrene, and is provided with a sample holding vessel 22 and a source 24 of ultraviolet light 25, such as a low-pressure mercury lamp 26 and a narrow bandpass filter 28 set to select 254 nm ultraviolet light. The sample readout chamber 30 comprises a light tight enclosure 32 provided with a sample holding tray 34, a photomultiplier tube 36 and a door 38 through which the tray 34 can be accessed.

In operation, the sample holding vessel 22 is filled with liquid nitrogen 44. A sample 40 of a thermoluminescent material, such as 30 milligrams of $CaF_2$:Mn in a dosimeter, is exposed to ionizing radiation (FIG. 2, step 68) and is then placed in the liquid nitrogen 44 in the vessel 22 and allowed to equilibrate to cryogenic temperatures (FIG. 2, step 70). Thereafter, the sample 40 is exposed to and "optically stimulated" by ultraviolet light (254 nm) from the light source 24 (FIG. 2, step 72). A 30 milligram sample of $CaF_2$:Mn should preferably be exposed to an amount of ultraviolet light equivalent to an amount of energy on the order of several millijoules.

The sample 40 is then removed from the sample exposure chamber 20 and quickly transferred to the sample readout chamber 30. The sample 40 is centered on the sample holding tray 34 and allowed to warm up to ambient temperature (i.e., room temperature or approximately 293 K). The sample holding tray is specially designed to be of sufficient thermal mass and have good heat transfer properties so that the sample 40 will warm up into room temperature range relatively rapidly, such as within 30 to 40 seconds of being placed in the chamber 30. As the sample 40 warms to higher and higher temperatures and especially as it passes the 200 K temperature level, the thermoluminescent material emits visible light at wavelengths in the range 494 nm ±50 nm. A substantial amount of the emitted light may be detected and amplified by the photomultiplier tube 36 (FIG. 2, step 74). The photomultiplier tube 36 is electrically connected to a recorder and display device 50, which counts the signal information supplied by the photomultiplier 36 and provides a display of the total amount of light released by the sample 40 (FIG. 2, also step 74). This total correlates with the dosage of radiation to which the thermoluminescent material was exposed.

Figure 3:
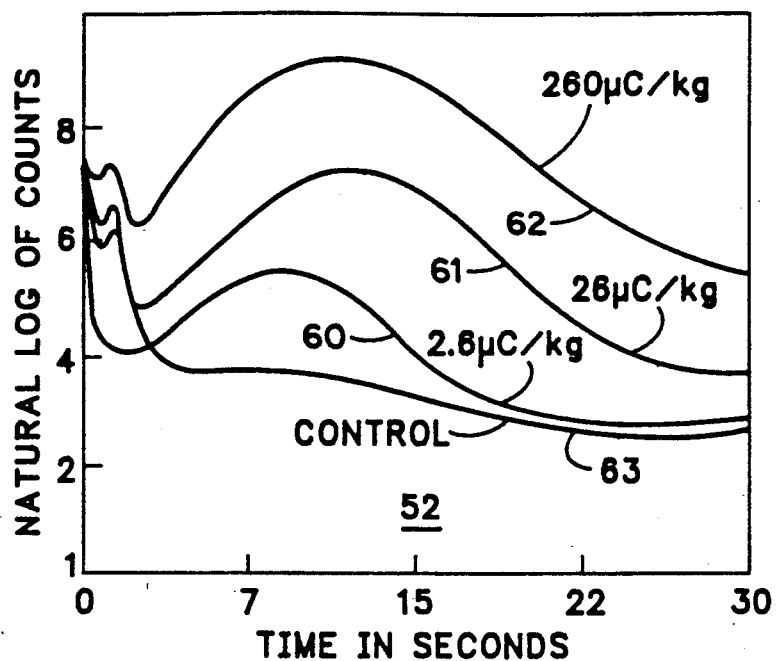
FIG. 3 is a graph illustrating low temperature glow curves corresponding to increasing radiation exposure as read out from samples of thermoluminescent material.

Referring now to FIG. 3, the graph 52 shows glow curves 60, 61, 62 and 63 for four different standard size (0.318 cm × 0.318 cm × 0.089 cm) samples of $CaF_2$ heavily doped with Mn to the extent of approximately three mole percent. The four samples having the glow curves 60, 61, 62 and 63 were exposed to different respective amounts of gamma radiation from a 137Cs source, namely 2.6, 26.0 and 260.0 and 0.0 microcoulomb/kg, respectively. The samples were cooled with liquid nitrogen and optically stimulated in accordance with the procedures previously described with reference to in FIG. 2, although, in this case, 351 nm excimer laser light was utilized to optically stimulate the samples with 50 pulses of light being applied to the samples at 60 mJ/$cm^2$/pulse. The glow curves 60, 61, 62 and 63 represent the log of the visible light photon count rates of the luminescence of the samples over time as the samples were allowed to warm up to ambient temperature. The peaks on the far left of the curves correspond to noise and should be ignored for current purposes. The graph 52 illustrates that both count rates and the count totals are proportional to the radiation dosages absorbed by the samples.

The principles underlying luminescence on warming to ambient temperature, after stimulation with ultraviolet light, involve the solid state physics of the "trapping" centers or sites that exist within thermoluminescent materials. As previously discussed in the background section, it is believed that exposure of a thermoluminescent material to ionizing radiation results in generation of electrons and holes in excited states, and these electrons and holes can be "trapped" in their excited states at these sites for extended periods. Trapping sites may occur at many different energy levels, which can be characterized by the temperatures at which the traps are emptied by thermal effects. It should be noted that trapping sites are often referred to simply as "traps" and this term is also used to refer to such sites when they are associated with electrons and holes in an excited state. Traps may also be redistributed or "photoconverted" from higher to lower energy levels by exposure to light radiation of appropriate wavelengths when the lower energy traps are stable as determined by the temperature of the thermoluminescent material. It is believed that this photoconversion process involves the absorption of light quanta by electrons and holes at high energy traps through electric dipole transitions. These electrons and holes are thereby raised into excited states of sufficient energy to be within the conduction band for the thermoluminescent material, and this allows them to become mobile and diffuse away from their original high energy trap sites. However, a large number of these electrons and holes are subsequently recaptured by low energy traps when the temperature of the material is sufficiently low.

By cooling the thermoluminescent material to cryogenic temperatures, the stability of lower energy traps, and especially traps around approximately 200 K, is ensured. Exposure to sufficient ultraviolet light in the range of 200–400 nm may then photoconvert many high energy traps into lower energy traps which would ordinarily not be stable because they correspond to temperatures below ambient temperature. These lower energy traps may then empty as the thermoluminescent material is subsequently heated thereby causing emission of light that can be detected and counted.

This method of operation is highly desirable since it allows a larger number of traps, including many higher energy traps, such as the known 658 K trap in $CaF_2$:Mn, that are inaccessible under prior art TLD techniques to be used in reading out energy dosages. Furthermore, quantum efficiencies are greatly improved as thermal quenching is reduced when readouts are taken at lower temperatures, and noise due to incandescent radiation from the samples is substantially reduced during readouts. Additionally, since photoconversion generally proceeds by partial stages, multiple readouts may be taken for a single radiation exposure of a target dosimeter. This allows for verification of dosimeter readings in a manner previously not possible.

The process described above is most effective when the thermoluminescent material is heavily doped with a metallic element. The exact amount of dopant will vary with the type of thermoluminescent material used and the nature of the dopant. However, approximately three mole percent of dopant is believed to be optimal, while amounts of dopant from one to fifteen mole percent should also provide satisfactory dosage detection sensitivity. These amounts of dopant are high as compared to the concentrations of dopant used in thermoluminescent materials used for conventional dosimetry, in which dopant concentrations are usually in the range of a few tenths of a percent by weight. Dopant concentrations have been limited in the past in order to avoid "concentration quenching" and attendant loss of sensitivity under conventional TLD techniques.

The process described above enables many useful plastic materials that would have melted during the heating phase of prior TLD techniques to be employed in dosimeter construction. Such plastics may conveniently serve as carriers for thermoluminescent materials. In particular it is desirable to provide very thin layers of thermoluminescent material in beta dosimetry, and plastics provide an excellent medium for forming thin layers of thermoluminescent materials. Likewise, plastics, such as polyethylene, can be used to form highly hydrogenous matrices in which 0.1-100 micron particles of large band-gap thermoluminescent crystals (such as $CaF_2$:Mn) can be embedded for fast-neutron dosimetry. The hydrogen in the plastic allows for the neutrons to be detected through proton-recoil effects while discrimination between gamma and neutron radiation can be accomplished through the use of small grain sizes.

The method may also be used in a number of fields where TLD techniques were previously subject to limitations, such as neutron radiography and imaging, remote monitoring, battlefield dosimetry, and environmental dosimetry. In particular, the method may be highly effective in battlefield dosimetry because of its quickness and accuracy, and in environmental dosimetry because of its accuracy and great sensitivity.

It is desirable to be able to anneal a dosimeter so that it is restored to its former (pre-exposure) condition and reused. Currently, a standard technique for annealing a calcium fluoride detector doped with manganese impurity is heating at 673 K for one hour and then heating at 373 K for two hours. Clearly, this annealing procedure cannot be used with a dosimeter in which the thermoluminescent material is embedded in a matrix of polyethylene, since the polyethylene will melt at a temperature well below 673 K.

FIG. 2 illustrates an alternative annealing procedure. As shown at step 76 in FIG. 2, after readout the thermoluminescent material is exposed to ultraviolet light at room temperature. This can be done using the equipment shown in FIG. 1. The sample holding tray 34 containing a sample of thermoluminescent material is removed from the sample readout chamber 30 and is placed in the sample exposure chamber 20. The sample is at room temperature, and in chamber 20 it is exposed to ultraviolet light from the source 24. When annealing is complete, the sample can again be exposed to ionizing radiation.

Standard size (0.318 cm $\times$ 0.318 cm $\times$ 0.089 cm) samples of calcium fluoride doped with manganese impurity at a concentration of 3 mole percent and having a mass of 30 mg were heat treated at 673 K for one hour and at 373 K for two hours. A natural background radiation exposure equivalent to a 2.6 microcoulomb/kg 137Cs gamma exposure was allowed to accumulate on the samples while the samples were shielded from exposure to light.

The irradiated samples were divided into two groups. The samples of one group were exposed to ultraviolet light from a helium-cadmium ultraviolet laser that emits 30 mW of power at 326 nm. The samples of the other group were exposed to light from a 1.0 kW xenon arc lamp in a Schoeffel 151N/2 lamp house. A Jobin Yvon DH-10 double monochromator set for a 325 nm center wavelength and a 12 nm passband was used to spectrally disperse the arc lamp output. A lens system was used to focus the output of the monochromator onto a sample, and the optical power incident on the sample was measured with a Laser Precision Rs-5900 radiometer and was found to be approximately 0.3 mW.

Exposure time using the helium/cadmium laser was controlled using a Uniblitz shutter and timer control. Exposure times with the arc lamp system were considerably longer than those with the laser because of the lower optical power provided by the arc lamp, so precise timing was not necessary. Exposure times were measured using a digital chronograph and a manual shutter was operated accordingly. The samples were covered with black cloth during exposure so that only the annealing ultraviolet light would reach the samples.

The samples in each group were divided into sets of three. One set in each group was not exposed to ultraviolet light. In each group, other sets were exposed to 50, 125, 250, 375, 750 and 1500 mJ respectively. Readout was then performed on both groups of samples, using steps 70, 72 and 74 described with reference to FIG. 2. During step 72, the helium/cadmium laser was used for optical stimulation of both groups, and a neutral density filter of one percent transmission was used to reduce the nominal beam power to 0.3 mW. For each sample, the exposure time was 50 seconds, and this provided 15 mJ of ultraviolet light.

Figure 4:
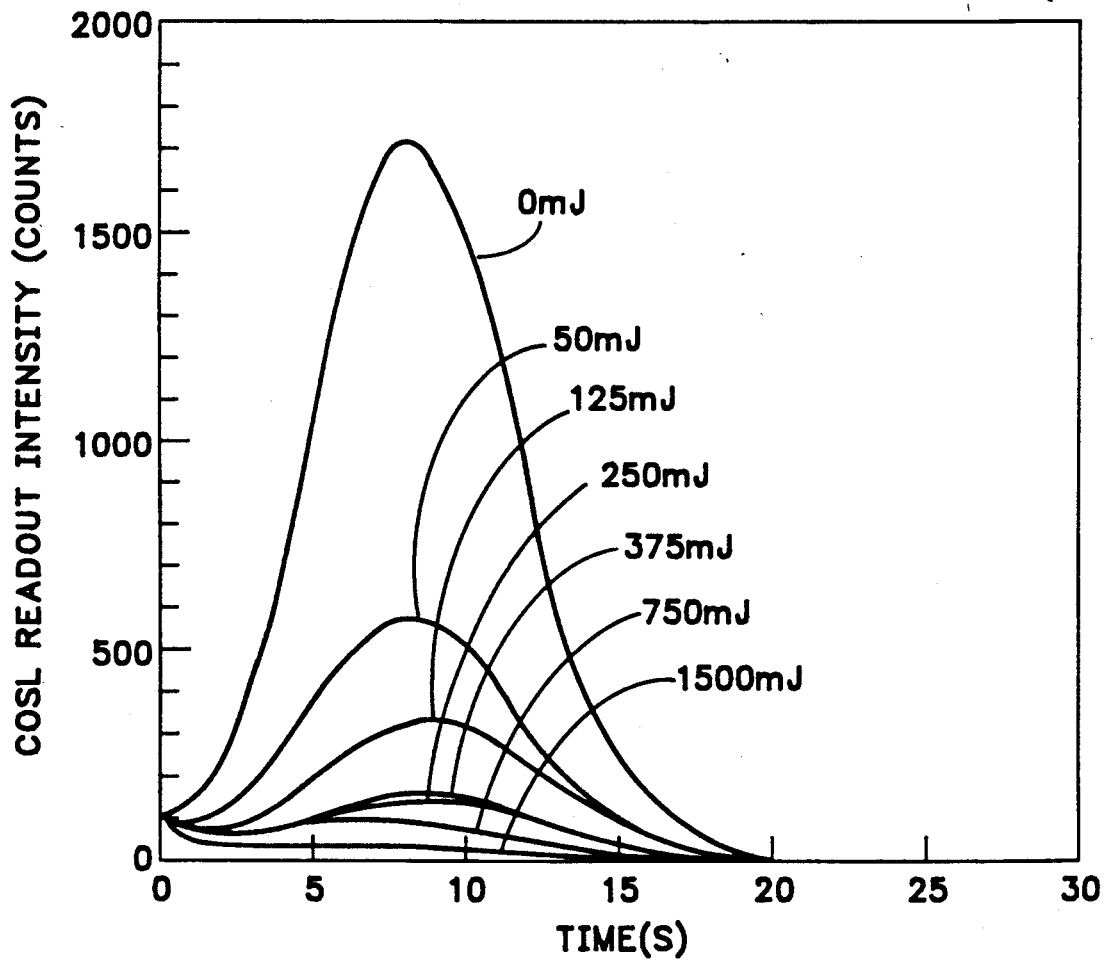
FIG. 4 is a graph illustrating glow curves produced following annealing at different energy levels by ultraviolet light emitted by a helium/cadmium laser.
Figure 5:
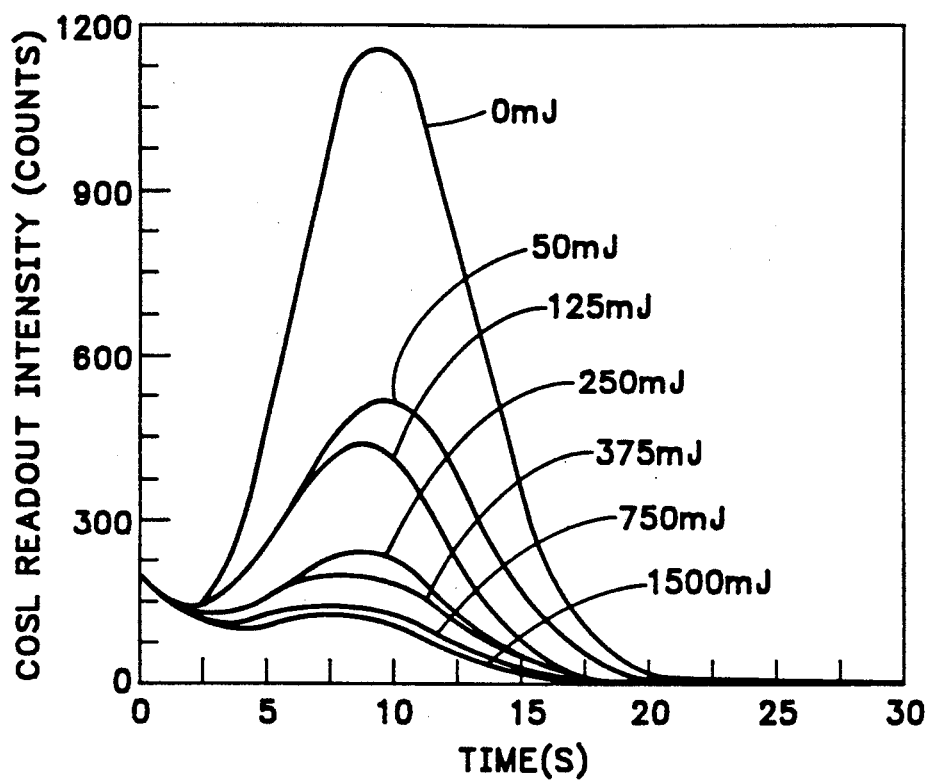
FIG. 5 is a graph illustrating glow curves produced following annealing at different energy levels by ultraviolet light emitted by an arc lamp.

FIGS. 4 and 5 illustrate the results of the readout for laser annealing and arc lamp annealing respectively. The shapes of the glow curves are the same for the two sources of ultraviolet light. The peaks of the curves for the sets that were not exposed to ultraviolet light are of different heights because the readout apparatus was not recalibrated between the FIG. 4 readouts and the FIG. 5 readouts. Annealing is satisfactory if the readout intensity never exceeds the initial intensity, and by this measure the glow curves for 1500 mJ of ultraviolet energy show that satisfactory annealing can be accomplished with either light source. However, the laser light source has the advantage that the 1500 mJ anneal required only 50 seconds, as opposed to 1.5 hours for the arc lamp anneal.

Figure 6:
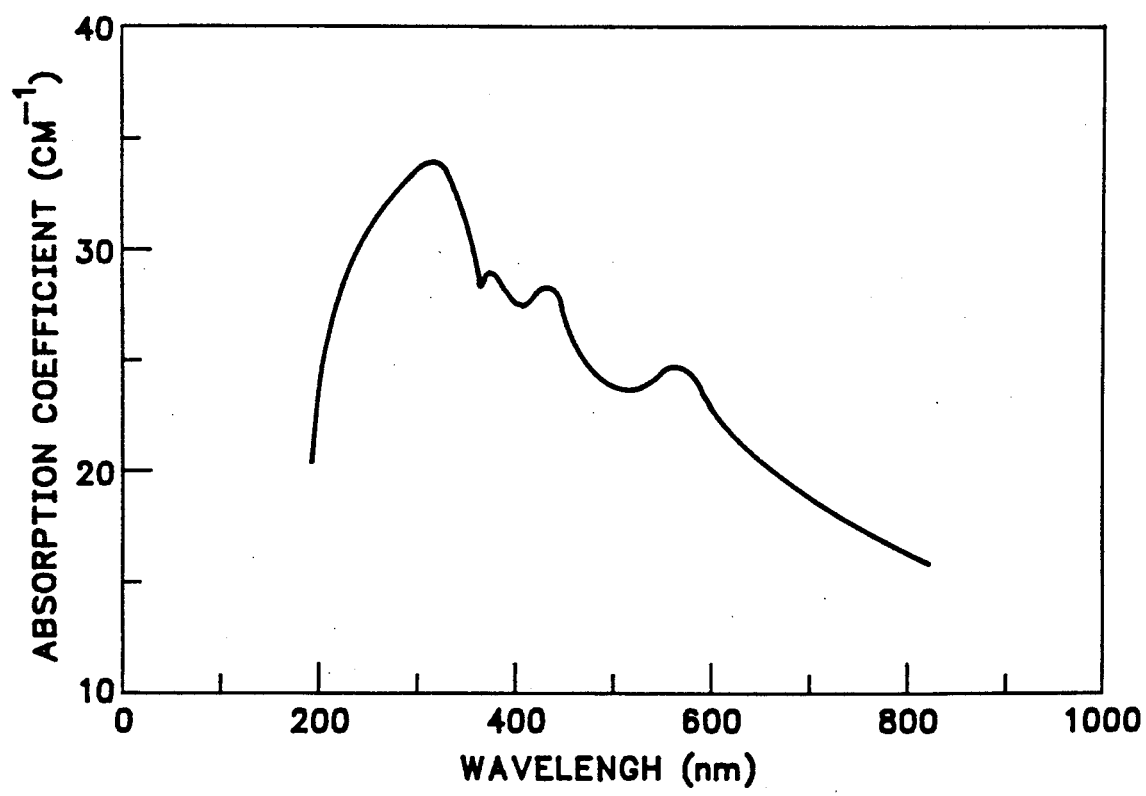
FIG. 6 is a graph illustrating the optical absorption curve for a thermoluminescent material.

In order to investigate the mechanism of the optical annealing, an optical absorption curve was measured for an irradiated sample of $CaF_2$:Mn that had been exposed to 26.0 coulombs/kg 60Co. The large radiation exposure was required to obtain a measurable optical absorption spectrum. The optical absorption curve is shown in FIG. 6, and three prominent peaks near 320 nm, 400 nm and 570 nm are clearly shown. It is believed that the wavelength bands chosen for optical annealing were optimal because they correspond closely to the major peak in the optical absorption curve. The other two prominent peaks were also investigated for annealing purposes, but neither was as effective as ultraviolet light at 1500 mJ. The 413 nm line from a krypton ion laser produced fifty percent annealing at 1500 mJ, while the 569 nm line produced no annealing at 1500 mJ.

The experiments described above show that the complete cycle of stimulation (step 72), readout (step 74) and annealing (step 76) can be accomplished in under two minutes using the 30 mW helium-cadmium laser. Since it is not necessary to heat the thermoluminescent material above room temperature, a dosimeter comprising particles of thermoluminescent material embedded in a matrix of synthetic polymer material can be annealed and reused.

It will be appreciated that the invention is not restricted to the particular embodiment that has been described, and that variations may be made therein without departing from the scope of the invention as defined in the appended claims and equivalents thereof. For example, although the invention has been described with reference to $CaF_2$:Mn, it is believed possible to use any of the conventional polycrystalline thermoluminescent materials in the present invention such as $CaF_2$, LiF, NaCl and $CaSO_4$, which are suitably doped with metallic elements. Any of the conventional dopants such as Mn, Mg, Ti, Ag, Ce, Pb and Dy may be employed. However, as previously noted, the dopant concentration should be relatively high compared to the concentration of dopant used in thermoluminescent materials for conventional dosimetry. The extent to which thermoluminescent material must be annealed prior to re-use depends on the dose that is to be measured. In order to measure a small dose, the thermoluminescent material must be annealed so as to empty substantially all the traps, but if it is not necessary to have the capability to measure small doses of radiation, the material need not be annealed so thoroughly.

We claim:

1. A method for measuring the dosage of ionizing radiation to which a thermoluminescent material has been exposed, comprising the steps of:
   (a) cooling the thermoluminescent material down to a temperature substantially below 200 K,
   (b) exposing the thermoluminescent material to ultraviolet light in order to photoconvert high temperature traps to low temperature traps, and
   (c) detecting light released by the thermoluminescent material as it is allowed to warm.

2. A method according to claim 1, wherein step (b) comprises exposing the thermoluminescent material to ultraviolet light at a power level below 0.033 mW per mg of thermoluminescent material.

3. A method according to claim 2, wherein step (b) comprises exposing the thermoluminescent material to ultraviolet light at a power level of about 0.01 mW per mg of thermoluminescent material.

4. A method according to claim 1, wherein step (b) comprises exposing the thermoluminescent material to at least about 0.33 mJ of ultraviolet energy per mg of thermoluminescent material.

5. A method according to claim 4, wherein step (b) comprises exposing the thermoluminescent material to about 0.5 mJ of ultraviolet energy per mg of thermoluminescent material 6. A method according to claim 1, wherein step (b) comprises exposing the thermoluminescent material to ultraviolet light in the range from about 290 nm–340 nm.

7. A method according to claim 6, wherein step (b) comprises exposing the thermoluminescent material to ultraviolet light at about 315 nm.

8. A method for measuring the dosage of ionizing radiation to which a thermoluminescent material has been exposed, comprising the steps of:
   (a) cooling the thermoluminescent material down to a temperature substantially below 200 K,
   (b) exposing the thermoluminescent material to light radiation in order to photoconvert high temperature traps to low temperature traps,
   (c) detecting light released by the thermoluminescent material as it is allowed to warm.
   (d) again cooling the thermoluminescent material down to a temperature substantially below 200 K,
   (e) again exposing the thermoluminescent material to light radiation in order to photoconvert high temperature traps to low temperature traps, and
   (f) again detecting light released by the thermoluminescent material as it is allowed to warm.

9. A method for measuring the dosage of ionizing radiation to which a thermoluminescent material has been exposed, the optical absorption spectrum of the thermoluminescent material having a peak in the ultraviolet region, the method comprising the steps of:
   (a) cooling the thermoluminescent material down to a temperature substantially below 200 K,
   (b) exposing the thermoluminescent material to light radiation in order to photoconvert high temperature traps to low temperature traps,
   (c) detecting light released by the thermoluminescent material as it is allowed to warm, and
   (d) exposing the thermoluminescent material to ultraviolet light.

10. A method for measuring the dosage of ionizing radiation to which a thermoluminescent material has been exposed, comprising the steps of:
    (a) cooling the thermoluminescent material down to a temperature substantially below 200 K,
    (b) exposing the thermoluminescent material to light radiation in order to photoconvert high temperature traps to low temperature traps,
    (c) detecting light released by the thermoluminescent material as it is allowed to warm, and
    (d) exposing the thermoluminescent material to light radiation in order to anneal the thermoluminescent material.

11. A method according to claim 10, further comprising the steps of:

(e) exposing the thermoluminescent material to ionizing radiation,
(f) cooling the thermoluminescent material down to a temperature substantially below 200 K,
(g) exposing the thermoluminescent material to light radiation in order to photoconvert high temperature traps to low temperature traps, and
(h) detecting light released by the thermoluminescent material as it is allowed to warm to a temperature substantially above 200 K.

12. A method according to claim 10, wherein step (d) comprises exposing the thermoluminescent material to at least 25 mJ of ultraviolet energy per mg of thermoluminescent material.

13. A method according to claim 12, wherein step (d) comprises exposing the thermoluminescent material to about 50 mJ of ultraviolet energy per mg of thermoluminescent material.

14. A method according to claim 10, wherein step (d) comprises exposing the thermoluminescent material to ultraviolet light at a power level substantially above 0.033 mW per mg of thermoluminescent material.

15. A method according to claim 14, wherein step (d) comprises exposing the thermoluminescent material to ultraviolet light at a power level of about 1 mW per mg of thermoluminescent material.

16. A method for annealing thermoluminescent material that has been exposed to ionizing radiation and from which light representative of the dose of radiation has been released, comprising exposing the thermoluminescent material to ultraviolet light at a temperature substantially of about 293 K.

17. A method for annealing thermoluminescent material that has been exposed to ionizing radiation and from which light representative of the dose of radiation has been released, the optical absorption spectrum of the thermoluminescent material having a peak in the ultraviolet region, said method comprising exposing the thermoluminescent material to ultraviolet light of a wavelength that is within about 10 nm of the wavelength of the peak of the optical absorption spectrum, the exposure to ultraviolet light being at a temperature substantially above 200 K.

18. A method according to claim 17, wherein step (d) comprises exposing the thermoluminescent material to at least 25 mJ of ultraviolet energy per mg of thermoluminescent material.

19. A method according to claim 18, wherein step (d) comprises exposing the thermoluminescent material to about 50 mJ of ultraviolet energy per mg of thermoluminescent material.

20. A method according to claim 17, wherein step (d) comprises exposing the thermoluminescent material to ultraviolet light at a power level substantially above 0.033 mW per mg of thermoluminescent material.

21. A method according to claim 20, wherein step (d) comprises exposing the thermoluminescent material to ultraviolet light at a power level of about 1 mW per mg of thermoluminescent material.

22. An apparatus for reading out the dosage of radiation to which a solid state thermoluminescent dosimeter had been exposed, comprising:
(a) means for cooling the dosimeter to cryogenic temperature;
(b) means for exposing the dosimeter to light radiation in order to photoconvert high temperature traps into low temperature traps;
(c) means for detecting and counting the light emitted by the dosimeter as it is allowed to warm, and
(d) means for exposing the dosimeter to ultraviolet radiation for annealing the thermoluminescent material to allow re-use of the dosimeter.

23. Apparatus according to claim 22, wherein the means for exposing the dosimeter to ultraviolet radiation comprise a source that emits ultraviolet radiation at a power level of at least 0.33 mW per mg of thermoluminescent material.

24. A dosimeter for detecting radiation, comprising:
a thermoluminescent material including a polycrystalline compound doped with a metallic element to a concentration much larger than a few tenths of a percent by weight; and
a matrix of a plastic material in which said thermoluminescent material is embedded.

25. A dosimeter according to claim 24, wherein the thermoluminescent material is in the form of particles that range in size from 0.1 to 100 microns.

26. A dosimeter according to claim 24, wherein said polycrystalline material comprises $CaF_2$:Mn.

27. A dosimeter according to 24, wherein said plastic material is of a low melting type.

28. A dosimeter according to claim 24, wherein the plastic material includes substantial amounts of hydrogen for generating proton-recoil interactions with neutrons in order to allow neutron radiation to be measured.

29. A dosimeter according to claim 24, wherein the polycrystalline compound is doped with the metallic element to the extent of at least one mole percent.

30. A dosimeter according to claim 29, wherein the polycrystalline compound in doped with the metallic element to the extent of about three mole percent.

* * * * *